(12) United States Patent
Bowra et al.

(10) Patent No.: US 8,914,529 B2
(45) Date of Patent: Dec. 16, 2014

(54) DYNAMICALLY ADAPTING MEDIA CONTENT STREAMING AND PLAYBACK PARAMETERS FOR EXISTING STREAMING AND PLAYBACK CONDITIONS

(75) Inventors: Todd Bowra, Redmond, WA (US); Nicholas Fang, Redmond, WA (US); Ashley Speicher, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1486 days.

(21) Appl. No.: 11/656,613

(22) Filed: Jan. 22, 2007

(65) Prior Publication Data
US 2008/0177893 A1 Jul. 24, 2008

(51) Int. Cl.
*G06F 15/173* (2006.01)
*H04L 29/06* (2006.01)
*H04N 21/258* (2011.01)
*H04N 21/6408* (2011.01)
*H04N 21/44* (2011.01)
*H04N 21/436* (2011.01)
*H04N 21/24* (2011.01)
*H04L 12/28* (2006.01)

(52) U.S. Cl.
CPC ............ *H04L 65/4084* (2013.01); *H04L 65/80* (2013.01); *H04N 21/25808* (2013.01); *H04N 21/6408* (2013.01); *H04N 21/44004* (2013.01); *H04N 21/43615* (2013.01); *H04L 21/2834* (2013.01); *H04N 21/2401* (2013.01); *H04L 2012/285* (2013.01)
USPC ......................................... 709/231; 709/232

(58) Field of Classification Search
USPC .................. 709/230, 231, 232, 233
See application file for complete search history.

(56) References Cited

U.S. PATENT DOCUMENTS

| | | | |
|---|---|---|---|
| 6,085,221 A * | 7/2000 | Graf | ............................... 709/202 |
| 6,728,763 B1 | 4/2004 | Chen | |
| 6,859,839 B1 | 2/2005 | Zahorjan et al. | |
| 6,928,495 B2 | 8/2005 | LeBlanc et al. | |
| 2002/0105951 A1 | 8/2002 | Hannuksela et al. | |
| 2002/0140851 A1 | 10/2002 | Laksono | |
| 2004/0133701 A1 * | 7/2004 | Karaoguz et al. | ............. 709/246 |
| 2005/0108414 A1 | 5/2005 | Taylor et al. | |

(Continued)

OTHER PUBLICATIONS

Layaida, et al., "Adaptive Media Streaming Using Self-reconfigurable Proxies", Date: 2004, pp. 1044-1055, vol. 3079/2004, Springer, Berlin, Heidelberg, http://www.springerlink.com/content/dxkqa5n2b1jg127u/.

Lee, et al., "Handoff-aware Adaptive Media Streaming in Mobile IP Networks", http://www.cse.ohio-state.edu/~prasun/publications/conf/icoin06.pdf.

(Continued)

*Primary Examiner* — Scott Christensen
(74) *Attorney, Agent, or Firm* — Micah Goldsmith; Peter Taylor; Micky Minhas

(57) ABSTRACT

Adjusting media streaming parameters of a media streaming device and media playback parameters of a media playback device is disclosed. In one embodiment, the system probes a network infrastructure to determine a network type, a playback device type, a streaming device type, a media content type, a preroll duration, and a playback device buffer size. Based upon these streaming and playback conditions, values of streaming parameters of a streaming device and values of playback parameters of a playback device are determined. Streaming parameters include the aggressiveness of the network transmitter, the slope of the transmit rate ramp-up, and the maximum transmit rate. Playback parameters include the amount of data prerolled by the playback device. The aforementioned values are sent to streaming and playback device control systems to control the streaming and the playback of the media, during and/or before playback.

11 Claims, 6 Drawing Sheets

(56) References Cited

U.S. PATENT DOCUMENTS

| | | |
|---|---|---|
| 2006/0109856 A1 | 5/2006 | Deshpande |
| 2006/0146703 A1 | 7/2006 | Cha et al. |
| 2006/0150222 A1 | 7/2006 | McCafferty et al. |
| 2006/0156201 A1 | 7/2006 | Zhang et al. |
| 2006/0168290 A1 | 7/2006 | Doron |
| 2006/0235654 A1 | 10/2006 | Parnes |
| 2007/0130597 A1* | 6/2007 | Parker et al. .................. 725/94 |

OTHER PUBLICATIONS

Krasic, et al., "Quality•Adaptive Media Streaming by Priority Drop", Date: Jun. 1-2, 2003, http://web.cecs.pdx.edu/~walpole/papers/nossdav2003.pdf.

Steinbach, et al., "Adaptive Playout for Low latency Video Streaming", http://www.lkn.ei.tum.de/~steinb/PUBLICATIONS/icip2001.pdf.

* cited by examiner

DYNAMICALLY ADAPTING MEDIA CONTENT STREAMING AND PLAYBACK PARAMETERS FOR EXISTING STREAMING AND PLAYBACK CONDITIONS

BACKGROUND

Computer networks couple various types of computer systems in a manner that enables the network coupled computer systems to access data from a variety of sources of information. Some computer networks allow media content to be streamed from one or more network coupled sources of media content to one or more network coupled receivers of media content. In such computer networks, media content can be streamed by media content servers and played back by media content playback systems that are associated with the media content receivers.

Parameters that are associated with the streaming and the playback of media content can affect the quality of the playback of streamed media content. In order to achieve a satisfactory playback performance, media content streaming and playback parameters must be configured in a manner that is suitable for existing streaming and playback conditions. Parameters that are associated with the streaming and playback of media content that can affect the playback of streamed media content can include but are not limited to bit rate of the media content stream, the amount of data that is prerolled by the playback system buffer and buffer size.

The bit rate of the media content stream determines the amount of data per unit time that needs to be supplied by a media content server to a media content receiver to ensure consistent playback. The amount of data that is prerolled is the amount of data that must be buffered before playback will begin. Buffer size determines the total amount of media content that the media content receiver or playback system associated therewith can cache. The configuration of parameters such as these can determine whether or not a satisfactory playback performance is achieved.

For example, although the highest bit rate transmission of media content that can be selected may allow a supply to a media content receiver of the highest quality signal that is available, a more satisfactory playback performance can sometimes be achieved if parameters are employed that result in a lower quality signal being supplied to the media content receiver. This can occur if the media content receiver is not suited to receive the amount of data required by such high quality media content or if the network is not suited to deliver data at the bit-rate associated with such high quality media content.

In another example, because larger sized buffers can accommodate more data than do smaller sized buffers, larger sized buffers enable playback of streamed media content to be less susceptible to transmission disturbances (e.g., be resilient to transmission disturbances) than do smaller sized buffers. Consequently, in environments where content streaming disturbances are more likely (such as where wireless delivery systems are employed) parameters that cause a larger sized buffer to be used can facilitate a more satisfactory playback performance. Conversely, smaller sized buffers allow memory to be saved for use by other system components.

Furthermore, a larger preroll of data provides greater resiliency to transmission disturbances than does a smaller preroll of data. However, a smaller preroll of data enables swifter initiation of playback than does a larger preroll of data. Consequently, parameters that determine the amount of data to be prerolled can determine the balance between how swiftly playback can be initiated and how resilient that playback will be to transmission disturbances.

Some conventional systems provide users with a limited capacity to manually select media content streaming and playback parameter values such as streaming rate, buffer size, and preroll amount. In conventional systems, the selection of parameter values such as streaming rate, buffer size, and preroll amount as a means of improving playback performance are typically based at least in part on speculations regarding media content streaming and playback conditions.

Such conventional systems do not provide an effective mechanism for controlling media content streaming and playback parameters. It should be appreciated that the effectiveness of conventional user streaming and playback parameter configurations are compromised both by the paucity of parameters that are available for configuration by users and the heavy reliance of such configurations on user speculation related to existing streaming and playback conditions. Additionally, once selections are made they may not be updated to address changed conditions. As such, these approaches are inadequate for optimizing playback performance and can provide unsatisfactory results.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Adjusting media streaming parameters of a media streaming device and media playback parameters of a media playback device is disclosed. In one embodiment, the system probes a network infrastructure to determine a network type, a playback device type, a streaming device type, a media content type, and a playback device buffer size. Based upon these streaming and playback conditions, values of streaming parameters of a streaming device and values of playback parameters of a playback device are determined. Streaming parameters include the aggressiveness of the network transmitter, the slope of the transmit rate ramp-up, and the maximum transmit rate. Playback parameters include the amount of data prerolled by the playback device and buffer size. The aforementioned values are sent to streaming and playback device control systems to control the streaming and the playback of the media.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While embodiments will be described herein, it will be understood that these descriptions are not intended to limit the disclosed subject matter to specific embodiments. On the contrary, the embodiments are intended to cover alternatives, modifications and equivalents, which may be included within the spirit and scope of the subject matter disclosed herein as defined by the appended claims. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1A:
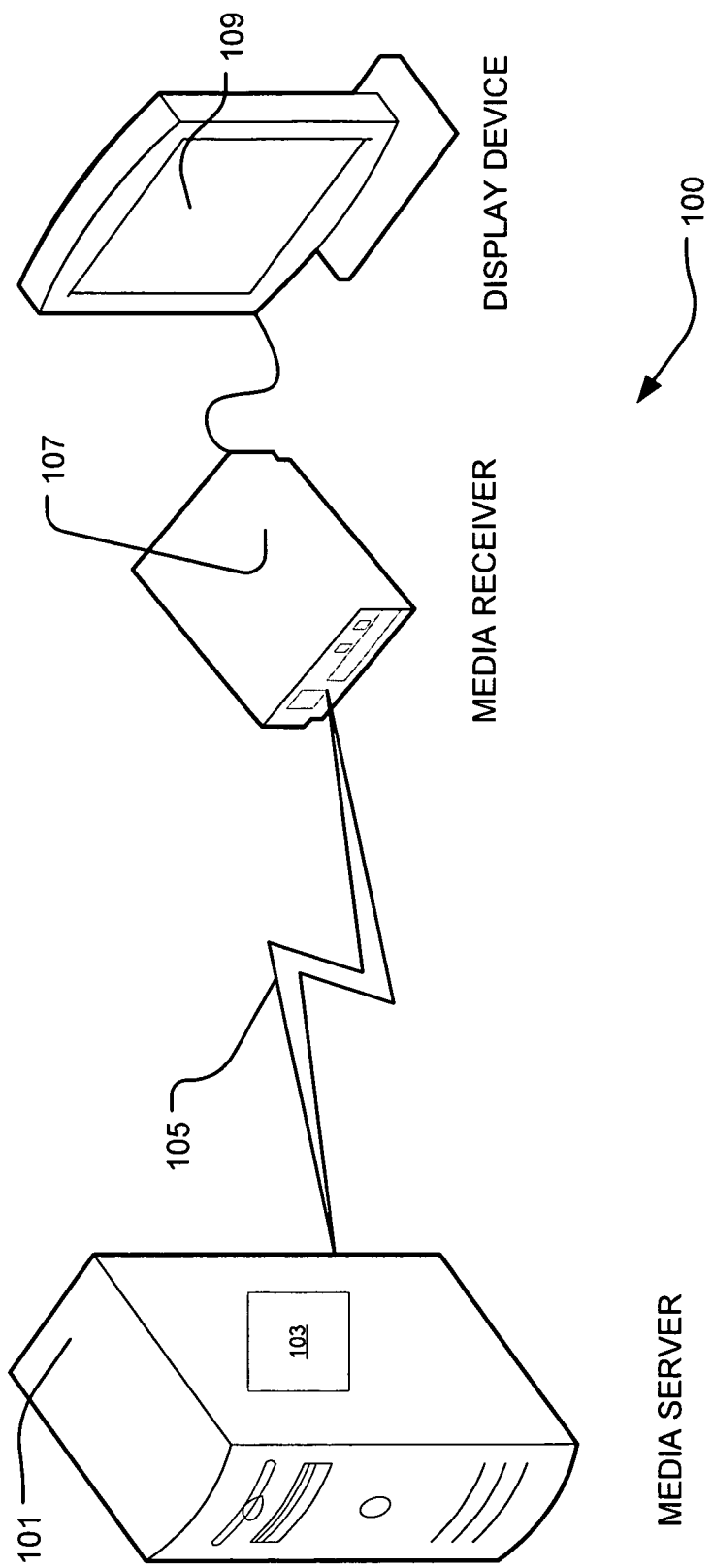
FIG. 1A shows an exemplary network operating environment of a system for dynamically adapting media content streaming and playback parameters according to one embodiment.

Exemplary Operating Environment of System for Dynamically Adapting Media Content Streaming and Playback Parameters FIG. 1A shows an exemplary network operating environment 100 of a system 103 for dynamically adapting media content streaming and playback parameters 103 according to one embodiment. In one embodiment, system 103 directs the dynamic adapting of media content streaming and playback parameters to correspond to existing media content streaming and playback conditions. However, system 103 can be used to direct dynamic adapting of media content streaming and playback parameters in a variety of operating environments. In one embodiment, system 103 can be used to direct dynamic adapting of media content streaming and playback parameters in a typical home entertainment operating environment such as is described herein in detail with reference to FIG. 1C. FIG. 1A shows media server 101 (streaming device), system 103 for dynamically adapting media content streaming and playback parameters, network link 105, media receiver 107 (playback device, renderer), and display device 109.

Referring to FIG. 1A, media server 101 supplies media content to media content receivers (e.g., 107) via network 105. In one embodiment, a variety of streaming and playback parameters of the media content that is supplied or streamed by media server 101 can be configurable. In one embodiment, media content streaming and playback parameters can be configured so as to optimize playback performance. In one embodiment, the configuration can be based on existing network conditions. In one embodiment, configuration is performed before the commencement of media content streaming. In an alternate embodiment, configuration is performed during media content streaming and playback.

In one embodiment, information related to existing conditions for streaming and playback of a particular sequence of media content that can be identified (e.g., such as by system 103) can include but is not limited to network fingerprint or other characteristics (whether wired or wireless, etc.), media device capabilities, attributes of the media stream to be played (e.g., the format of the media content and whether it is file-based or live), and buffer size information. File based media content is intended to refer to content that is streamed from a file based media content source. Live media content is intended to refer to content that is streamed from a streamed media content source.

In one embodiment, configurable media content streaming and playback parameters include but are not limited to: (1) aggressiveness of the network transmitter (streaming parameter), (2) the amount of data to be prerolled by the renderer (playback device) before rendering starts (playback parameter), (3) the upward slope of the transmit rate (streaming parameter), and (4) the maximum transmit rate (streaming parameter). In one embodiment, these streaming and playback parameters can be configured through operation of system 103.

As used herein the term "aggressiveness of the transmitter" is intended to refer to the amount of data transmitted per unit time by the media transmitter associated with media server 101. Factors that are considered in determining how aggressive the transmitter is to be include but are not limited to: how much of the available network capacity to consume, how to respond to apparent network overload, and how to recover from network overload.

In one embodiment, media server 101 can be a personal computer (PC) capable of running one or more multimedia software packages that can include but are not limited to Windows® XP™ Media Center Edition operating system. In one embodiment, media server 101 can be included as a part of a home entertainment platform. Moreover, media server 101 can be configured to integrate a full range of computing functionality alongside a complete home entertainment system into a single PC.

For example, in one embodiment, a user can view television programming in one graphical window of a video monitor, while using email or preparing a spreadsheet in another graphical window. In addition, in one embodiment, media server 101 can accommodate other features or components that can include but are not limited to: a personal video recorder (PVR) to capture live TV shows for future viewing or to record the future broadcast of a single program or series, a compact disc (CD) or digital video disc (DVD) drive for disc media playback, a memory drive for integrated storage of and access to a user's recorded content, such as TV shows, songs, pictures, and home videos, and an electronic program guide (EPG).

Instead of a PC as discussed above, media server 101 can comprise a variety of other devices that are capable of storing and distributing media content. Such devices can include but are not limited to, for example, a notebook or portable computer, a tablet PC, a workstation, a mainframe computer, a server, an Internet appliance, or combinations thereof. In addition, media server 101 can also be a set-top box capable of delivering media content to a computer system where it can be streamed, or the set-top box itself can stream the media content. As media server 101 can encompass a general purpose computer system that runs an operating system, a user can also optionally run standard computer programs (e.g., word processing and spreadsheets), send and receive emails, browse the Internet, or perform other common functions.

In either case, the user can choose a tuner to suit particular preferences. For example, a user wishing to watch both standard definition (SD) and high definition (HD) content may employ a tuner configured for both types of contents. Alternately, the user can employ an SD tuner for SD content and an HD tuner for HD content separately.

In one embodiment, TV content can be received either as an analog (i.e., radio frequency) signal or a digital signal (e.g., digital cable). Moreover, the received TV content can include discrete content packets, where each content packet includes actual TV content (i.e., audio and video data) in addition to a playback or protection policy or policies associated with the actual TV content. If TV content is received as an analog signal, discrete content packets can be created from the analog signal.

Referring again to FIG. 1A, as discussed above, system 103 directs the dynamic adapting of media content streaming and playback parameters for existing streaming and playback conditions. In one embodiment, system 103 can reside at server 101. In another embodiment, system 103 can reside at a location that is remote from server 101 (e.g., media receiver 107). In one embodiment, as a part of its operation, system 103 directs the probing of network link 105 to identify existing conditions (such as discussed above) for streaming and playback of a particular sequence of media content.

In one embodiment, the identification of these conditions can be used to determine values of streaming and playback parameters to be used in the streaming and the playback of a particular sequence of media content. In this manner an optimal playback experience of the particular sequence of media content can be achieved. It should be appreciated that a single media stream can consist of many different sequences. Moreover, in one embodiment, streaming and playback parameters may not be fixed for an entire stream, but can change dynamically while the stream progresses.

It should be appreciated that once values of parameters to be used for streaming and playback of a particular sequence of media content are determined, values of parameters used for streaming and playback of the particular sequence of media content can be set based on the determined values. As such, streaming and playback parameters are configured to provide an optimal playback experience.

For example, a value that corresponds to a size of a jitter buffer to be used for playback of media content can be determined as discussed above, and provided to a playback control system of a rendering device associated with a media receiver (e.g., 107). In this manner the media receiver (e.g., 107) can be directed to maintain a larger jitter buffer (such as for a wireless or otherwise variable throughput network) or a smaller jitter buffer (such as for a wired or otherwise stable throughput network) for playback of the media content based upon determined network characteristics. As another example, the media server can be directed to transmit at a slower transmit rate (such as for streaming data to a low-capability rendering device) or a faster transmit rate (such as for streaming data to a high-capability rendering device) based upon determined network characteristics and the capabilities of the rendering device.

Referring again to FIG. 1A, media receiver 107 receives streamed media content that is supplied by server 101. In one embodiment, media playback parameters of a rendering system associated with media receiver 107 (e.g., amount of data prerolled before rendering begins) can be adjusted based on existing network streaming and playback conditions (e.g., whether network is wired or wireless, jitter buffer size, etc.). Various media receiver 107 embodiments are discussed herein in detail with reference to FIG. 1C.

Display device 109 displays the streamed media content that is supplied by server 101 via network link 105 to media receiver 107. Various display device and network link implementations are discussed in detail below with reference to FIG. 1C.

Operation

Figure 1B:
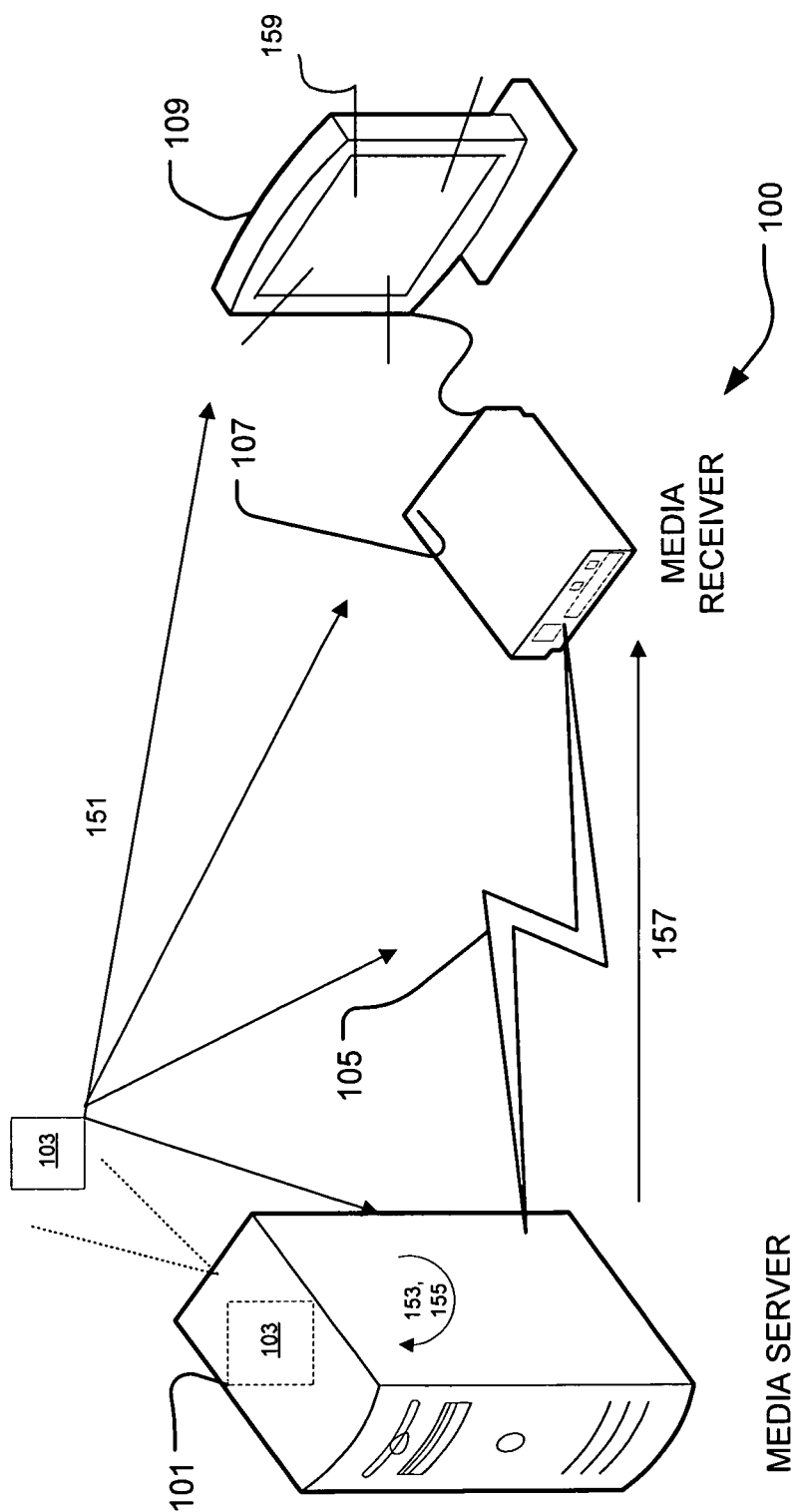
FIG. 1B illustrates the operation of the system for dynamically adapting media content streaming and playback parameters according to one embodiment.

FIG. 1B illustrates the operation of a system for dynamically adapting streaming and playback parameters 103 according to one embodiment. In FIG. 1B, exemplary operations 151-157 are illustrated. It should be appreciated that these illustrations are provided for purposes of clarity and brevity. However, other operations not shown in FIG. 1B can be performed in accordance with one embodiment.

Referring to FIG. 1B, at 151 the media content streaming and playback infrastructure is probed at the direction of system 103 to identify existing conditions for streaming and playback of a particular sequence of media content. As is shown in FIG. 1B, each component of the media content streaming and playback infrastructure such as the content server 101, the network link 105, the receiver 107 and the display device 109 can be probed for information.

At 153 based upon the aforementioned conditions that are identified at the direction of system 103, values of media content streaming and playback parameters can be determined for use in the streaming and playback of a particular sequence of media content that facilitate an optimal media content playback experience.

At 155, once values of parameters to be used for streaming and playback of the particular sequence of media content are determined, values of parameters used for streaming and playback of the particular sequence of media content are set based on the determined values. It should be appreciated that the semi-circular arrow associated with reference numerals 153 and 155 are intended to represent the role that components of media server 101 (e.g., processor) play, at the direction of system 103, as a part of identifying existing conditions for streaming and playback of media content and determining values of parameters to be used for streaming and playback of media content. At 157, media content is streamed to media content receiver 107 based upon the streaming and playback parameters determined at 155. And, at 159 a playback of the media content is presented on display device 109.

Home Entertainment Operating Environment According to One Embodiment

Figure 1C:
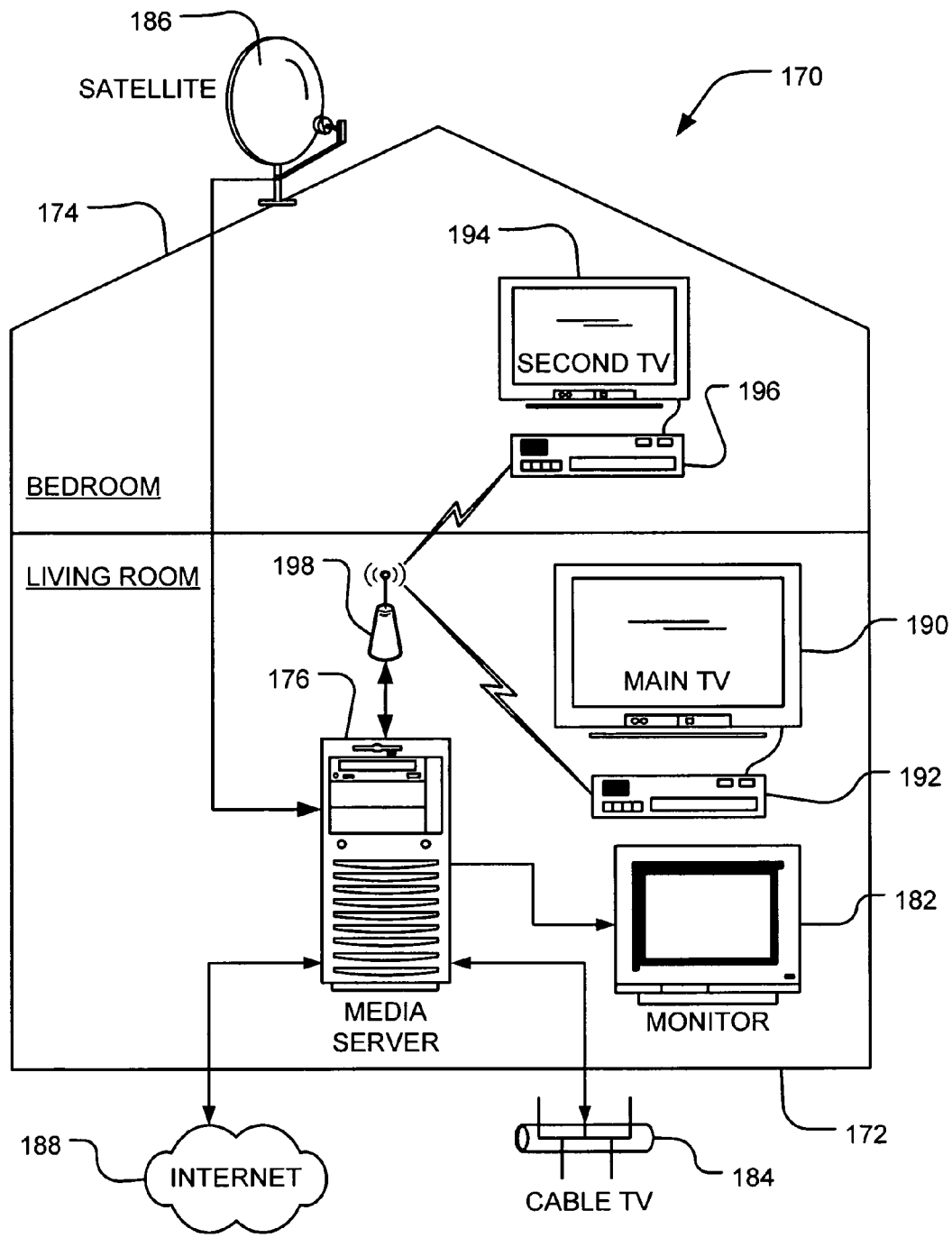
FIG. 1C shows a home entertainment operating environment for a system for dynamically adapting media content streaming and playback parameters according to one embodiment.

FIG. 1C shows an exemplary home operating environment according to one embodiment. In a home entertainment operating environment 170 such as is shown in FIG. 1C, media receivers 192 and 196 can be placed in communication with media server 176 through network 198 (for example a local area network (LAN)). In an exemplary embodiment, the media receivers 192, 196 can be Media Center Extender devices, for example, an Xbox 360™ (Microsoft Corporation, Redmond, Wash.).

In one embodiment, media server 176 can be coupled to a variety of media sources. Such media sources can include but are not limited to, for example, a cable connection 184, a satellite receiver 186, an antenna (not shown for the sake of clarity and brevity), and/or a network such as the Internet 188. Moreover, a user can determine whether a live stream of media content (e.g., TV content) is received, for example, via the cable connection 184, the satellite receiver 186, or antenna. In one embodiment, this capability can be enabled by one or more tuners residing in media server 176. In another embodiment, the one or more tuners can be situated in a location that is remote from media server 176.

In addition to the aforementioned Media Center Extender devices, media receivers 192 and 196 can also include a variety of conventional media rendering or computing devices, including, for example, a set-top box, a television, a video gaming console, a desktop PC, a notebook or portable computer, a workstation, a mainframe computer, an Internet appliance, a handheld PC, a cellular telephone or other wireless communications device, a personal digital assistant (PDA), or combinations thereof. Furthermore, media receivers 192 and 196 can include a tuner as described above.

Network 198 can comprise a wired and/or a wireless network. In one embodiment, network 198 can include but is not limited to, for example, cable TV 184, Ethernet, WiFi, a wireless access point (WAP), or any other electronic coupling means, including the Internet 188. It should be appreciated that network 198 can accommodate communication between media server 176, media receivers 192 and 196 and any other coupled device through packet-based communication protocols, such as transmission control protocol (TCP), Internet protocol (IP), real-time transport protocol (RTP), and real-time transport control protocol (RTCP). In one embodiment, communications can be transmitted directly between devices over a LAN, or they may be carried over a wide area network (WAN), for example, the Internet 188.

In one embodiment, as is shown in FIG. 1C, one or more video display devices, for example a main TV 190 in a first room (e.g., living room 172), a secondary TV 194 in a second room (e.g., bedroom 174), and a video monitor 182 can be situated at disparate locations in home operating environment 170. These video display devices can be coupled to media server 176 via network 198 either directly or via media receivers 192 and 196.

In one embodiment, main TV 190 and secondary TV 194 can be coupled to media receivers 192 and 196 through conventional cables. In another embodiment, main TV 190 and secondary TV 194 can be coupled to media receivers 192 and 196 via wireless transmissions.

Video monitor 182 can be coupled to media server 176 directly via a video cable or via wireless transmissions. Media server 176 and media receivers 192 and 196 can also or alternatively be coupled to any of a variety of other video and audio presentation devices. Importantly, media content, including TV content, can be supplied to each of the video display devices 182, 190 and 194 over home network 198 from a media server (e.g., 176), either directly or through a media receiver that can be situated in the same room (e.g. receiver 192 in living room 172) or a remote room (e.g. receiver 196 in bedroom 174).

Media receivers 192, 196 can be configured to receive streamed media content, including video and TV content, from media server 176. Media content, particularly video and TV content, can be transmitted from the media server 176 to media receivers 192 and 196 as streaming media comprised of discrete content packets via any of the network protocols described above. The streamed media content can comprise video streamed over the internet, SD, and HD content, including video, audio, and image files, decoded on home network devices 192 and 196 for presentation on the coupled TVs 190 and 194.

The media content can further be "mixed" with additional content, for example, an EPG, presentation content related to the media content, a web browser window, and other user interface environments transmitted from the media server for presentation on TVs 190 and 194 or monitor 182. Such additional media content can be delivered in a variety of ways using different protocols, including, for example, standard remote desktop protocol (RDP), graphics device interface (GDI), or hypertext markup language (HTML).

In addition to the media receivers 192 and 196 and video display devices 182, 190 and 194, media server 176 can be coupled to other peripheral devices, including components such as digital video recorders (DVR), cable or satellite set-top boxes, speakers, and a printer (not shown for the sake of graphic clarity). Media server 176, media receivers 192 and 196 and/or display devices 182, 190 and 194 can also enable multi-channel output for speakers. This can be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) surround decoding.

Figure 2:
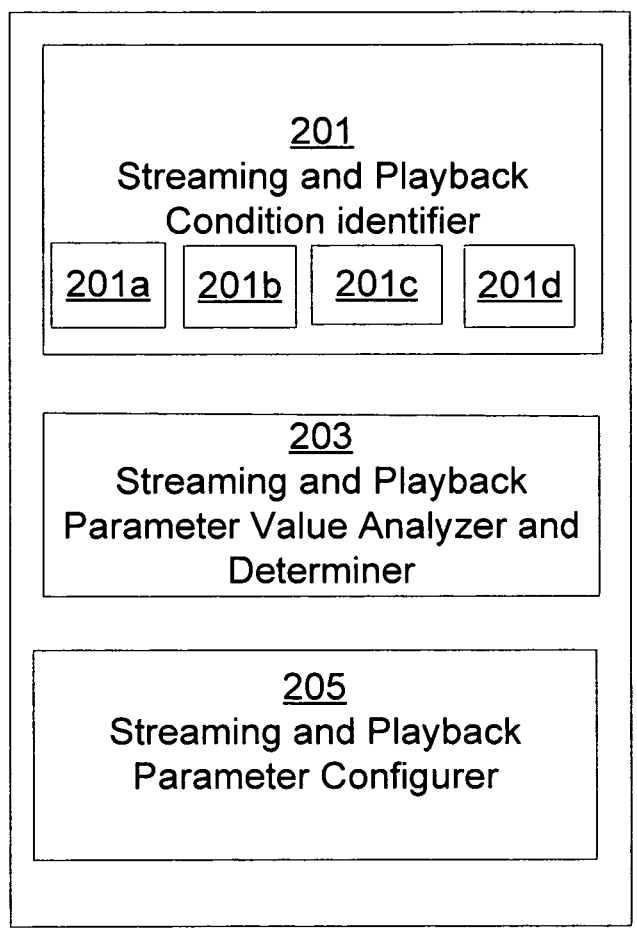
FIG. 2 shows components of the system for dynamically adapting media content streaming and playback parameters according to one embodiment.

Components of System for Dynamically Adapting Media Content Streaming and Playback Parameters for Existing Conditions According to Embodiments FIG. 2 shows components 200 of system 103 for dynamically adapting streaming and playback parameters 103 (from FIG. 1A) according to one embodiment. System 103 directs the dynamic adapting of media content streaming and playback parameters to correspond to existing media content streaming and playback conditions. In the FIG. 2 embodiment, system 103 includes streaming and playback condition identifier 201, streaming and playback parameter value analyzer and determiner 203 and streaming and playback parameter configurer 205.

It should be appreciated that aforementioned components of system 103 can be implemented in hardware or software or in a combination of both. In one embodiment, components and operations of system 103 can be encompassed by components and operations of one or more computer programs that execute on a media server (e.g., 101 in FIG. 1A). In another embodiment, components and operations of system 103 can be separate from the aforementioned one or more computer programs but can operate cooperatively with components and operations thereof.

Referring to FIG. 2, the streaming and playback condition identifier 201 identifies and/or collects information related to existing conditions for streaming and playback of a particular sequence of media content. In one embodiment, the streaming and playback condition identifier 201 can include sub-components, such as, but not limited to, network characteristics identifier 201a, device capabilities identifier 201b, media stream attribute identifier 201c and buffer size identifier 201d.

In one embodiment, the network characteristics identifier 201a identifies network fingerprint or other characteristics, the device capabilities identifier 201b identifies streaming and playback device capabilities, the media stream attribute identifier 201c identifies media stream attributes, and the buffer size identifier 201d identifies a suggested size of the buffer (for example wireless 1000 ms of buffer and wired 200 ms wired, etc.) and a suggested amount of preroll.

As discussed with reference to FIG. 1A, information related to existing conditions for streaming and playback of a particular sequence of media content can include but is not limited to network fingerprint or other characteristics (whether wired, wireless, etc.), device capabilities, attributes of the media stream to be played (e.g., the format of the content and whether it is file-based or a live stream), buffer size and preroll information.

The streaming and playback parameters value analyzer and determiner 203 determines values of parameters to be used for streaming and playback of media content based upon analysis of the information identified by the streaming and playback condition identifier 201 related to existing streaming and playback conditions. In one embodiment, streaming and playback parameter values can be determined using a process (such as involving an algorithm and/or lookup table) that associates streaming and playback values with identified streaming and playback conditions such that optimal streaming and playback parameter values can be identified for given streaming and playback conditions.

The streaming and playback parameters configurer 205 causes the adjustment of streaming and playback parameters used for streaming and playback of streamed media content. In one embodiment, the streaming and playback parameter configurer 205 can provide the streaming and playback parameter values determined by the streaming and playback parameters value analyzer and determiner 203 as inputs to media content streaming and playback control systems that respond to such inputs by setting or adjusting the value of streaming and playback parameters based on the inputs.

As discussed with reference to FIG. 1A, configurable media content streaming and playback parameters include but are not limited to: (1) aggressiveness of the network transmitter (streaming parameter), (2) the amount of data to be prerolled by the renderer before rendering starts (playback parameter), (3) the upward slope of the transmit rate (streaming parameter), and (4) the maximum transmit rate (streaming parameter). In one embodiment, these streaming and playback parameters can be configured through operation of system 103.

In one embodiment, information related to the media content that can be used to determine configuration parameters includes the format of the media content and whether the media content is file based or live. In one embodiment, a parameter configuration can be performed before a commencement of media content streaming. In one embodiment, a transmit rate and aggressiveness for the media content can be lower for wireless than for wired networks. In one embodiment, a transmit rate and aggressiveness for the media content can be based on the maximum receive rate of the media content receiver. In one embodiment, the proximity of a seek position (the position in a stream of media content sought to be reached by a user for playback) to a live position (the furthermost position in a stream of media content that can be reached for playback) can be determined so as to determine the amount of prerolling to provide. It should be appreciated that a current position is the position in a stream of media content that media content currently being played back by the playback device is based upon. In one embodiment, for streams in which content is currently being captured at the playback rate, a greater amount of preroll may be preferable when the current position is at or near the live position relative to other possible current positions because there is no possibility of filling the media receiver's jitter buffer at a rate higher than the playback rate.

Figure 3:
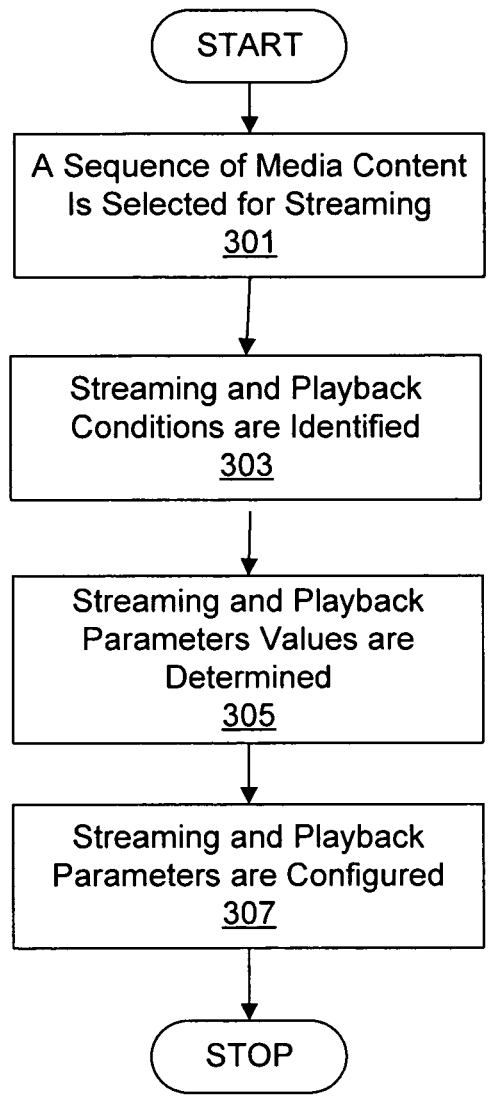
FIG. 3 shows a flowchart of the steps performed in a method for dynamically adapting media content streaming and playback parameters according to one embodiment.

Exemplary Operations of System for Dynamically Adapting Media Content Streaming and Playback Parameters According to Embodiments FIG. 3 shows a flowchart 300 of the steps performed in a system for dynamically adapting media content streaming and playback parameters according to one embodiment. The flowchart includes processes that, in one embodiment, can be carried out by processors and electrical components under the control of computer-readable and computer-executable instructions. Although specific steps are disclosed in the flowcharts, such steps are exemplary. Moreover, embodiments are well suited to performing various other steps or variations of the steps recited in the flowcharts. Within various embodiments, it should be appreciated that the steps of the flowcharts can be performed by software, by hardware or by a combination of both.

Referring to FIG. 3, at step 301, a sequence of media content is selected for streaming by a media server and playback by a media receiver.

At step 303, existing streaming and playback conditions for the sequence of media content selected in step 301 are identified. In one embodiment, a streaming and playback condition identifier (e.g., 201 in FIG. 2) identifies existing conditions for streaming and playback of a particular sequence of media content. In one embodiment, existing conditions for streaming and playback of the particular sequence of media content can include but is not limited to network, device, content, and buffer size/preroll conditions.

At step 305, optimal streaming and playback parameter values are determined. In one embodiment, a streaming and playback parameter value analyzer and determiner (e.g., 203 in FIG. 2) determines values of parameters used for streaming and playback of media content based on an analysis of the existing conditions identified by a streaming and playback condition identifier (e.g., 201 in FIG. 2) related to existing streaming and playback conditions. In one embodiment, streaming and playback parameter values can be determined using a process (e.g., involving an algorithm and/or lookup table) that associates streaming and playback values with identified streaming and playback conditions such that optimal streaming and playback parameter values can be determined for given streaming and playback conditions.

At step 307, streaming and playback parameters for the particular sequence of media content that is selected in step 301 are configured. In one embodiment, a streaming and playback parameter configurer (e.g., 205 in FIG. 2) causes the adjustment of streaming and playback parameters used for streaming and playback of streamed media content. In one embodiment, a streaming and playback parameter configurer (e.g., 205 in FIG. 2) can provide the streaming and playback parameter values determined by the streaming and playback parameters value analyzer and determiner (e.g., 203 in FIG. 2) as inputs to media content streaming and playback control systems that respond to such inputs by setting or adjusting the value of streaming and playback parameters based on the inputs.

Exemplary Hardware and Operating Environment According to One Embodiment

Figure 4:
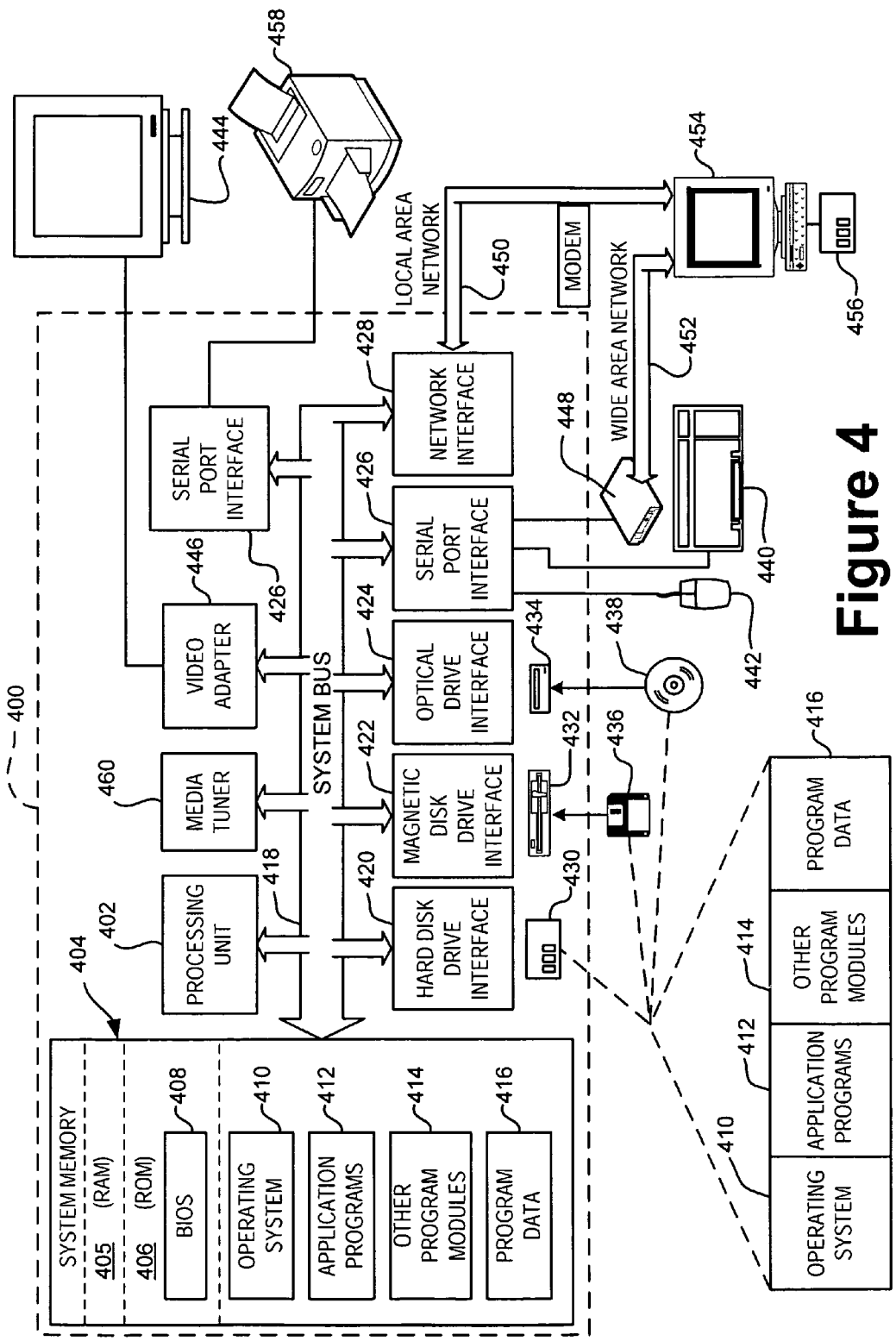
FIG. 4 shows an exemplary hardware operating environment according to one embodiment.

FIG. 4 shows an exemplary hardware operating environment according to one embodiment. As discussed with reference to FIG. 1A, media server 101 (shown in FIG. 1A), and media receiver devices 107 (shown in FIG. 1A) can comprise general purpose computing devices. Moreover, a general purpose computing device can encompass a computer 400 that includes a processing unit 402, a system memory 404 and a system bus 418 that operatively couples various system components including the system memory 404 to the processing unit 402. In one embodiment, there can be one or more processing units (e.g., 402), such that processing unit 402 can comprise a single central processing unit (CPU), or a plurality of processing units (e.g., a parallel processing environment). In one embodiment, computer 400 may be a conventional computer, a distributed computer, or any other type of computer.

The system bus 418 may be any of several types of bus structures including a memory bus or memory controller, a peripheral bus, a switched fabric, point-to-point connections, and a local bus using any of a variety of bus architectures. The system memory 404 can include read only memory (ROM) 406 and random access memory (RAM) 405. A basic input/output system (BIOS) 408, containing the basic routines that help to transfer information between elements within the computer 400, such as during start-up, can be stored in ROM 406. The computer 400 can further include a hard disk drive 430 for reading from and writing to a hard disk, not shown, a magnetic disk drive 432 for reading from or writing to a removable magnetic disk 436, and an optical disk drive 434 for reading from or writing to a removable optical disk 438 such as a CD ROM, DVD, or other optical media.

As shown in FIG. 4, the hard disk drive 430, magnetic disk drive 432, and optical disk drive 434 can be connected to the system bus 418 by a hard disk drive interface 420, a magnetic disk drive interface 422, and an optical disk drive interface 424, respectively. In one embodiment, the drives and their associated computer-readable media provide nonvolatile storage of computer-readable instructions, data structures, program modules and other data for the computer 400. It should be appreciated by those skilled in the art that any type of computer-readable media that can store data that is accessible by a computer, for example, magnetic cassettes, flash memory cards, digital video disks, RAMs, and ROMs, can be used in the exemplary operating environment shown in FIG. 4.

A number of program modules can be stored on hard disk 430, magnetic disk 432, optical disk 434, ROM 406, or RAM 405, including an operating system 410, one or more application programs 412, (e.g., a multimedia software package) other program modules 414, (e.g., a visualization engine, an audio/video decoder, a UI generator and a metadata decoder) and program data 416 (e.g., media content). Moreover, a user can enter commands and information into the computer 400 through input devices such as a keyboard 440 and a pointing device 442 (e.g., a mouse). Other input devices (not shown) can include but are not limited to a microphone, a joystick, a game pad, a tablet, a touch screen device, a satellite dish, a scanner, a facsimile machine, and a video camera. These and other input devices are often connected to processing unit 402 through a serial port interface 426 that is coupled to system bus 418, but can be connected by other interfaces, such as a parallel port, a game port, or a universal serial bus (USB).

A monitor 444 or other type of display device can also be connected to system bus 418 via an interface, such as a video adapter 446. In addition to monitor 444, computers typically include other peripheral output devices, such as a printer (e.g., 458) and speakers (not shown). These and other output devices can be connected to processing unit 402 through a serial port interface 426 that is coupled to system bus 418, but can be connected by other interfaces, such as parallel port, game port, or universal serial bus (USB). In the case of a media server, a tuner 460 can also be connected with system bus 418 in order to receive and convert analog content signals into digital format and similarly convert digital content into analog signals for transmission to connected devices.

Computer 400 can operate in a networked environment using logical connections to one or more remote computers, such as remote computer 454. These logical connections can be achieved by means of a communication device that can be coupled to or integral with computer 400. It should be appreciated that the invention is not limited to a particular type of communications device. Remote computer 454 can be another computer, a server, a router, a network personal computer, a client, a peer device, or other common network node, and can include many or all of the elements described above relative to computer 400, although only a memory storage device 456 is illustrated in FIG. 4. It should be appreciated that the logical connections depicted in FIG. 4 can include a wired or wireless local-area network (LAN) 450, for example, an Ethernet network, or a WiFi network, and a wide-area network (WAN) 452, for example, a cable network or a telephony network. Such networking environments are commonplace in office networks, enterprise-wide computer networks, intranets and the Internet, which are all types of networks.

In one embodiment, when employed in a LAN 450 environment, computer 400 can be connected to local network 450 through a network interface or adapter 428, which is a type of communications device. Moreover, when employed in a WAN 452 environment, computer 400 can include a modem 448, a network adapter, or any other type of communications device for establishing communications over the wide area network 452. The modem 448, which can be internal or external, can be connected to the system bus 418 via the serial port interface 426. In a networked environment, program modules depicted relative to the personal computer 400, or portions thereof, can be stored in a remote memory storage device. It is appreciated that the network connections shown are exemplary and other means of establishing a communications link between the computers can be used.

With reference to exemplary embodiments thereof, adjusting media streaming parameters of a media streaming device and media playback parameters of a media playback device is disclosed. In one embodiment, the system probes a network infrastructure to determine a network type, a playback device type, a streaming device type, a media content type, and a playback device buffer size. Based upon these streaming and playback conditions, values of streaming parameters of a streaming device and values of playback parameters of a playback device are determined. Streaming parameters include the aggressiveness of the network transmitter, the slope of the transmit rate ramp-up, and the maximum transmit rate. Playback parameters include the amount of data pre-rolled by the playback device. The aforementioned values are sent to streaming and playback device control systems to control the streaming and the playback of the media.

The foregoing descriptions of specific embodiments have been presented for purposes of illustration and description. They are not intended to be exhaustive or to limit the subject matter to the precise forms disclosed, and obviously many modifications and variations are possible in light of the above teaching. The embodiments were chosen and described in order to best explain the principles of the disclosed subject matter and its practical application, to thereby enable others skilled in the art to best utilize the disclosed subject matter and various embodiments with various modifications as are suited to the particular use contemplated. It is intended that the scope of the disclosed subject matter be defined by the Claims appended hereto and their equivalents.

What is claimed is:

1. A method for adjusting media streaming and playback parameters, comprising:
   determining one or more characteristics about a streaming device and a playback device in a playback and streaming environment during media content streaming and media playback, the one or more characteristics comprising a buffer size of the playback device;
   determining the media content is live;
   determining one or more values of parameters for controlling said media streaming and media playback, said values based on the one or more determined characteristics and that the media content is live, the one or more values comprising a maximum transmit rate;

sending said values to media streaming and media playback device control systems of said streaming device and said playback device to control said streaming and said playback of said media;

determining a proximity of a seek position to a live position; and determining an amount of prerolling that said playback device needs to perform based on said proximity, the amount of prerolling to comprise an amount of data to buffer before playback.

2. The method of claim 1 wherein the one or more characteristics about the streaming device and the playback device in the playback and streaming environment include the determination of one or more of a network type, a streaming device type, a playback device type, a media content type, and a playback device preroll duration.

3. The method of claim 1 wherein said parameters comprise one or more of an aggressiveness of a network transmitter, an amount of data prerolled by said playback device before playback starts, and a slope of a transmit rate ramp-up.

4. The method of claim 1 wherein a transmit rate of said media content is based on a maximum receive rate of said media content.

5. A computer useable medium having computer-executable components comprising:
   a condition set collection component for collecting and/or identifying a set of existing conditions relating to streaming and playback of a media content sequence by a streaming device and a playback device during said streaming and playback of said media content sequence, the media content sequence is live, the set of existing conditions comprising a playback device buffer size;
   a parameter value analysis and determination component for determining values of parameters for controlling said streaming and playback, said parameters based on said conditions, the values comprising a maximum transmit rate; and
   a parameter value configuration component for sending said values to streaming and playback control systems of said streaming device and said playback device for adapting the operation of those systems, wherein a proximity of a seek position to a live position is determined to determine an amount of prerolling to provide, wherein the proximity is inversely related to the amount of prerolling.

6. The medium of claim 5 wherein said conditions comprise one or more of a network type, a streaming device type, a playback device type, and a media content type.

7. The medium of claim 5 wherein said parameters comprise one or more of an aggressiveness of a network transmitter, an amount of data to be prerolled by a renderer before rendering starts, and a slope of a transmit rate ramp-up.

8. The medium of claim 5 wherein a transmit rate of said media content is based on a maximum receive rate of the media receiver.

9. An apparatus comprising:
   a computer readable memory unit; and
   a processor coupled to said memory unit, said processor for setting streaming and playback parameters of media content for a respective media server and a media receiver based upon existing conditions for streaming and playback of a sequence of media content, the existing conditions including a buffer size of the media receiver, the media content is live, the streaming and playback parameters comprising a maximum transmit rate of the media content, a proximity of a seek position to a live position is determined to determine an amount of prerolling to provide, the amount of prerolling to comprise an amount of data the media receives is to buffer, the proximity is inversely related to the amount of prerolling.

10. The apparatus of claim 9 wherein said information related to said existing conditions for streaming and playback of said sequence of media content comprises one or more of a network type, a media server type, a media receiver type, and a media content type.

11. The apparatus of claim 9 wherein said streaming and playback parameters comprise one or more of an aggressiveness of a network transmitter, an amount of data prerolled by a renderer before rendering starts, and a slope of a transmit rate ramp-up.

* * * * *